United States Patent
Haneji et al.

(10) Patent No.: US 10,009,941 B2
(45) Date of Patent: Jun. 26, 2018

(54) COMMUNICATIONS DEVICE, APPARATUS, SYSTEM, METHOD AND COMPUTER IMPLEMENTABLE INSTRUCTIONS PRODUCT

(71) Applicant: NEC Corporation, Tokyo (JP)

(72) Inventors: Hayato Haneji, Berkshire (GB); Iskren Ianev, Berkshire (GB); Yannick Lair, Berkshire (GB)

(73) Assignee: NEC Corporation, Tokyo (JP)

( * ) Notice: Subject to any disclaimer, the term of this patent is extended or adjusted under 35 U.S.C. 154(b) by 108 days.

(21) Appl. No.: 14/892,131

(22) PCT Filed: May 16, 2014

(86) PCT No.: PCT/JP2014/002604
§ 371 (c)(1),
(2) Date: Nov. 18, 2015

(87) PCT Pub. No.: WO2014/188694
PCT Pub. Date: Nov. 27, 2014

(65) Prior Publication Data
US 2016/0113057 A1 Apr. 21, 2016

(30) Foreign Application Priority Data
May 20, 2013 (GB) .................................. 1309074.1

(51) Int. Cl.
*H04W 76/20* (2018.01)
*H04W 4/00* (2018.01)
(Continued)

(52) U.S. Cl.
CPC ........... *H04W 76/045* (2013.01); *H04W 4/70* (2018.02); *H04W 76/25* (2018.02); *H04W 76/34* (2018.02)

(58) Field of Classification Search
CPC ...... H04W 4/005; H04W 4/12; H04W 72/042
See application file for complete search history.

(56) References Cited

U.S. PATENT DOCUMENTS 9,049,588 B2 * 6/2015 Choi ..................... H04W 8/245
9,100,160 B2 * 8/2015 Martinez
                       Tarradell ............... H04W 24/04
(Continued)

FOREIGN PATENT DOCUMENTS

EP     1 006 695 A1    6/2000
EP     2 509 345 A1    10/2012
(Continued)

OTHER PUBLICATIONS

Extended European Search Report issued in corresponding European Patent Application No. 14800957.4, dated Jan. 2, 2017, 7 pages.

(Continued)

*Primary Examiner* — Kashif Siddiqui
(74) *Attorney, Agent, or Firm* — Wilmer Cutler Pickering Hale and Dorr LLP

(57) ABSTRACT

A system (1) is disclosed in which a network entity determines whether a radio bearer should be maintained or released for a communications device (2). The communications device (2) establishes the radio bearer via a base station (5) of the communications system (1) and communicates data using the established radio bearer. The communications device (2) determines whether any further data is to be sent or received and/or whether a user-plane connection is required. The communications device (2) then provides information to the network entity identifying a result of said determination for use in determining whether the radio bearer should be maintained or released.

12 Claims, 6 Drawing Sheets

(51) Int. Cl.
| | |
|---|---|
| *H04W 76/30* | (2018.01) |
| *H04W 76/04* | (2009.01) |
| *H04W 4/70* | (2018.01) |
| *H04W 76/34* | (2018.01) |
| *H04W 76/25* | (2018.01) |

(56) References Cited

U.S. PATENT DOCUMENTS

| | | | |
|---|---|---|---|
| 2009/0247176 A1 | 10/2009 | Song et al. | |
| 2012/0023234 A1 | 1/2012 | Martin | |
| 2013/0028235 A1 | 1/2013 | Barrett | |
| 2013/0080597 A1* | 3/2013 | Liao | H04W 4/005 709/219 |
| 2013/0100895 A1 | 4/2013 | Aghili et al. | |
| 2013/0308545 A1* | 11/2013 | Lee | H04W 4/005 370/328 |
| 2014/0016614 A1* | 1/2014 | Velev | H04W 4/005 370/331 |
| 2014/0242962 A1* | 8/2014 | Choi | H04W 8/245 455/418 |
| 2014/0301288 A1* | 10/2014 | Koc | H04W 76/00 370/329 |
| 2015/0172847 A1* | 6/2015 | Yang | H04W 4/20 370/328 |
| 2015/0181606 A1* | 6/2015 | Gribe | H04W 4/06 370/329 |
| 2016/0007213 A1* | 1/2016 | Cui | H04W 4/005 370/230 |

FOREIGN PATENT DOCUMENTS

| | | |
|---|---|---|
| GB | 2493216 A | 1/2013 |
| WO | WO-2009/121023 A1 | 10/2009 |
| WO | WO 2009121023 A1 * | 10/2009 ......... H04W 76/068 |
| WO | WO-2011/060998 A1 | 5/2011 |
| WO | WO-2011/119680 A2 | 9/2011 |
| WO | WO-2013/144606 A1 | 10/2013 |

OTHER PUBLICATIONS

Catt "Analysis of RAN3 Impact for SDDTE Solutions", 3GPP TSG RAN WG3#80, R3-130839, Fukuoka, Japan, May 20-24, 2013, pp. 1-5.
International Search Report, Corresponding to PCT/JP2014/002604, dated Aug. 19, 2014, 2 pp.
SA WG2 Meeting #96, "Modifications to the Small Data transmission over NAS solution," S2-131080, Apr. 8-12, 2013, 5 pp.
SA WG2 Meeting #97, "Updates to Small Data connection release clause 5.1.1.3.1 (solution 1)", S2-131735, May 27-31, 2013, 7 pp.
United Kingdom Intellectual Property Office Search Report, corresponding to GB1309074.1, dated Nov. 25, 2013, 4 pp.
3GPP TS 23.401 v12.0.0, Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 12)," Mar. 2013, 290 pp.
3GPP TS 22.368 v12.2.0, Technical Specification, "3rd Generation Partnership Project; Technical Specification Group Services and System Aspects; Service requirements for Machine-Type Communications (MTC); Stage 1 (Release 12)," Mar. 2013, 24 pp.
3GPP TR23.887 v0.8.0, Technical Report, "3rd Generation Partnership Project; Technical Specification Group Services and System Aspects; Machine-Type and other Mobile Data Applications Communications Enhancements (Release 12)," Feb. 2013, 107 pp.
Japanese Office Action issued by the Japan Patent Office for Application No. 2015-556891 dated Jul. 5, 2016 (7 pages).
Samsung, "Initial analysis on RAN3 input for SDDTE solutions," 3GPP TSG-RAN WG3 Meeting #80, R3-131036, Agenda Item 19, Fukuoka, Japan, 6 pages (May 20-24, 2013).

* cited by examiner

COMMUNICATIONS DEVICE, APPARATUS, SYSTEM, METHOD AND COMPUTER IMPLEMENTABLE INSTRUCTIONS PRODUCT

CROSS-REFERENCE TO RELATED APPLICATIONS

The present application is a national stage application of International Application No. PCT/JP2014/002604 entitled "Communications Device, Apparatus, System, Method and Computer Implementable Instructions Product," filed on May 16, 2014, which claims the benefit of priority from Great Britain Application No. 1309074.1, filed on May 20, 2013, the disclosures of which are incorporated herein in their entirety by reference thereto.

TECHNICAL FIELD

The present invention relates to a communications system. The invention has particular but not exclusive relevance to wireless communications systems and devices thereof operating according to the 3rd Generation Partnership Project (3GPP) standards or equivalents or derivatives thereof. The invention has particular although not exclusive relevance to the provision of assistance information by Machine-Type Communications devices.

BACKGROUND ART

The latest developments of the 3GPP standards are referred to as the Long Term Evolution (LTE) of EPC (Evolved Packet Core) network and E-UTRAN (Evolved UMTS Terrestrial Radio Access Network). Under the 3GPP standards, a NodeB (or an eNB in LTE) is the base station via which communications devices connect to a core network and communicate to other communications devices or remote servers. For simplicity, the present application will use the term base station to refer to any such base stations. In the core network, a home subscriber server (HSS) entity holds information related to the services subscribed/available for each communication device. Mobility of the communication devices (i.e. access to the core network via various radio access networks) is managed by a so-called mobility management entity (MME). The MME communicates with the communication devices using non-access stratum (NAS) protocol messages.

Communications devices might be, for example, mobile communications devices such as mobile telephones, smartphones, user equipment, personal digital assistants, laptop/tablet computers, web browsers, e-book readers and the like. Such mobile (or even generally stationary) devices are typically operated by a user. However, 3GPP standards also make it possible to connect Machine-Type Communications (MTC) devices (sometimes also referred to as Machine-to-Machine (M2M) communications devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems and the like. MTC devices can be implemented as a part of a (generally) stationary apparatus such as vending machines, roadside sensors, POS terminals, although some MTC devices can be embedded in non-stationary apparatus (e.g. vehicles) or attached to animals or persons to be monitored/tracked.

For simplicity, the present application refers to MTC devices in the description but it will be appreciated that the technology described can be implemented on any communications devices (mobile and/or generally stationary) that can connect to a communications network for sending/receiving data, regardless whether such communications devices are controlled by human input or software instructions stored in memory. In particular, the term 'MTC device' is intended to cover any communications device implementing MTC functionality, such as mobile telephones/user equipment (UE) running an MTC application.

In order to be able to communicate with each other, a Radio Resource Control (RRC) connection needs to be established between an MTC device and the radio access network (RAN), i.e. a base station of that RAN currently serving the MTC device. Under normal circumstances, an RRC connection for a particular MTC device is usually released by the RAN/base station due to inactivity of the MTC device. In some cases, an existing RRC connection may also be released due to a communication failure, authentication error, and/or the like. An RRC connection may also be released upon a request from a core network entity (e.g. the MME) and/or the MTC device itself (e.g. when it is being switched off).

Inactivity of a communications device is determined by the serving base station at the expiry of a so called 'user inactivity' timer, when the base station releases the RRC connection for the inactive communications device. Upon expiry of the user inactivity timer, the base station also notifies the core network about the release of the RRC connection using a so-called UE context release procedure, which is described in more detail in section 5.3.5 of the 3GPP TS23.401 standards specification.

Since the use and the length of the user inactivity timer are implementation dependant, details of these are not provided in the above specification. However, the release of a RRC connection for inactivity of an MTC device is typically carried out as follows. The base station runs a user inactivity timer (per RRC connection) during the existence of an RRC connection between the base station and the MTC device. Whenever the MTC device sends or receives data, the base station re-starts the user inactivity timer associated with that MTC device (i.e. the RRC connection used by the MTC device). When the user inactivity timer expires (i.e. it reaches a predefined value or it reaches zero if counting down from the predefined value), the base station initiates the RRC connection release procedure referred to above.

MTC devices connect to the network whenever they have data to send to or receive from a remote 'machine' (e.g. a server) or user. MTC devices use communication protocols and standards that are optimised for mobile telephones or similar items of user equipment (UEs). However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in the 3GPP TS 22.368 standard, the contents of which are incorporated herein by reference.

In accordance with section 7.2.5 of TS 22.368, MTC devices can benefit from a so-called 'small data transmissions' functionality, intended for the sending and/or receiving of small amounts of data (typically in the order of 1K (1024) octets of data). In order to implement this feature, the system supports transmissions of small amounts of data with minimal impact on e.g. signalling overhead, network resources, and delay for reallocation of resources, regardless whether or not the MTC device is attached to the network before transmitting data. The network counts the number of small data transmissions per subscription e.g. for charging or statistical purposes. This allows charging and accounting of small data transmissions between network operators on a bulk basis.

More recently, optimisation of small data transmissions (including keep-alive messages from smartphones) has been considered by 3GPP as part of the MTCe-SDDTE (Small Data transmission and Device Triggering Enhancements) work item, published under section 5.1 of 3GPP TR23.887—the contents of which are incorporated herein by reference.

SUMMARY OF INVENTION

Technical Problem

One of the key issues is the efficiency of small data transmissions (including keep-alive messages) by MTC devices. It has been suggested that in case of mobile originated small data transmissions, instead of using a base station initiated RRC connection release procedure (e.g. inactivity timer run by the base station), the MME may control the RRC connection release.

According to section 5.1.1.3.1.1 of TR23.887, "The MME uses knowledge of the subscriber to determine whether to proceed with the full UE triggered Service Request procedure, or, to immediately release the RRC connection, or to wait for some time (e.g. to see if a downlink IP packet causes the S-GW to send a Downlink Data notification to the MME)". This MME centric approach may be applied in case of mobile originated (MO) small data transmissions. The term 'Service Request' procedure as used herein includes, for example, the exchange of keep-alive messages and/or small data transmissions by the MTC device.

However, "knowledge of the subscriber" that is already available from the subscriber information stored in the MME and/or HSS may not always be sufficient for the MME to decide whether or not the RRC connection for a particular MTC device can be released. For example, this suggested approach may lead to an early release of the RRC connection by the MME (i.e. whilst the MTC device still has data to send/receive), which would in turn generate additional signalling messages between the MTC device and the base station in order to re-establish the interrupted RRC connection between them. In some cases, the MME may decide, based on the information available to it, not to release a particular RRC connection even if the MTC device does not require this RRC connection anymore (e.g. it has no more data to send/receive). In this case, the RRC connection may be maintained until expiry of the user inactivity timer at the base station (or even longer if the base station relies on the MME to release the RRC connection). This is also wasteful of the network resources.

It has also been suggested in TR23.887 that in case of mobile terminated (MT) small data transmissions, the MTC device can request its serving base station to release the RRC connection. In MT case, the MTC device typically sends an Internet Protocol (IP) packet to the MME as an acknowledgement. The IP packet is sent in an encrypted information element (IE) using NAS signalling included in an uplink information transfer message transmitted to the base station. The base station forwards the NAS signalling to the MME. Upon receipt of the IP packet, the MME decrypts the IE, and also controls termination of the requesting MTC device's connection in the core network, e.g. by terminating a corresponding bearer at a gateway serving entity serving the MTC device (i.e. the so called serving gateway or S-GW). The request for the base station to release the RRC connection may be added as an optional IE in the uplink information transfer message sent from the MTC device to the base station.

However, the optional release indication from the MTC device to its serving base station also does not cover all possible MT scenarios and it does not address the issues associated with the MME centric control suggested for MO small data transmissions.

Accordingly, preferred embodiments of the present invention aim to provide methods and apparatus which address or at least partially deal with one or more of the above needs.

Although for efficiency of understanding for those of skill in the art, the invention will be described in detail in the context of a 3GPP system (UMTS, LTE), the principles of the invention can be applied to other systems in which communications devices or User Equipment (UE) access a core network using a radio access technology.

Solution to Problem

In one aspect, the invention provides a communications device for providing information to a network entity for use in determining whether a radio bearer should be maintained or released, the communications device comprising: means for establishing the radio bearer via a base station of a communications system for sending or receiving data; means for sending or receiving data using the established radio bearer; means for providing to the network entity information configured to indicate a potential for future data to be sent or received by said communications device for use, by the network entity, in determining whether the radio bearer should be maintained or released accordingly.

Said information configured to indicate a potential for future data to be sent or received by said communications device may comprise information configured to indicate whether or not any further data is to be sent or received by said communications device.

Said information configured to indicate a potential for future data to be sent or received by said communications device may comprise information configured to indicate whether or not a user-plane connection is required for said communications device to be able to send or receive said future data.

In one aspect, the invention provides a communications device for providing information to a network entity for use in determining whether a radio bearer should be maintained or released, the communications device comprising: means for establishing the radio bearer via a base station of a communications system for sending or receiving data; means for sending or receiving data using the established radio bearer; means for determining at least one of: i) whether or not any further data is to be sent or received by said communications device; and ii) whether or not a user-plane connection is required for said communications device; and means for providing to the network entity information identifying a result of said determination for use, by the network entity, in determining whether the radio bearer should be maintained or released accordingly.

The means for sending or receiving data may be operable to send or receive said data as a data packet in a payload of a control plane message. In this case, the means for sending or receiving data may be operable to send or receive said data as a data packet in a payload of a radio resource control (RRC) message. For example, the means for sending or receiving data may be operable to send said data as a data packet in a payload of an uplink information transfer message or receive said data as a data packet in a payload of a downlink information transfer message. The means for sending or receiving data may also be operable to send or receive said data as a data packet in a payload of an RRC connection setup complete message.

The information providing means may be operable to provide said information identifying a result of said determination to said network entity as part of a procedure for establishing said radio bearer.

The determining means may determine that no further data is to be sent or received by said communications device, in which case said information identifying a result of said determination may comprise an indication that no further data is to be sent or received by said communications device.

The determining means may determine that further data is to be sent or received by said communications device, in which case said information identifying a result of said determination may comprise an indication that further data is to be sent or received by said communications device. In this case, the further data may comprise data to be sent in response to data received by said communications device. The further data may also comprise data requiring establishment of a user plane connection for said communications device.

The providing means may be operable to provide said information identifying a result of said determination to said network entity by sending at least one RRC message to said base station. In this case, the providing means may be operable to send said at least one RRC message as part of an RRC connection establishment procedure. The providing means may be operable to provide said information identifying a result of said determination using at least one information element in said at least one RRC message.

The at least one RRC message may include at least one non-access stratum (NAS) message. In this case, the providing means may be operable to provide said information identifying a result of said determination using said at least one NAS message.

The means for sending or receiving data may be operable to send said data as a data packet in a payload of said at least one RRC message in which said information identifying a result of said determination is provided to said network entity. The data packet may require a response to be received at said communications device, in which case said information identifying a result of said determination may indicate that no further data is to be sent or received by said communications device after receipt of said response. The data packet may comprise data sent in response to data received by said communications device, in which case wherein said information identifying a result of said determination may indicate that said communications device expects no further data to be sent or received after sending said data packet.

The providing means may be operable to send said information identifying a result of said determination to said base station. The providing means may be operable to send said information identifying a result of said determination to a core network entity. The providing means may be operable to send said information identifying a result of said determination to said base station via said core network entity.

The communications device may comprise at least one of a machine-type communications device, a mobile telephone, and user equipment operating in accordance with long term evolution (LTE) standards.

In one aspect, the invention also provides an apparatus for managing a radio bearer for a communications device, the apparatus comprising: means for communicating data with said communications device using a radio bearer; means for obtaining information from said communications device, said information indicating, for the communications device, at least one of: i) whether or not any further data is to be sent or received by said communications device; and ii) whether or not a user-plane connection is required by said communications device; means for determining, from said obtained information, whether the radio bearer should be maintained or released; and means for maintaining said radio bearer in dependence of said determination.

The data communicating means may be operable to send or receive said data as a data packet in a payload of a control plane message. In this case, the data communicating means may be operable to send or receive said data as a data packet in a payload of a radio resource control (RRC) message. For example, the data communicating means may be operable to send said data as a data packet in a payload of a downlink information transfer message or receive said data as a data packet in a payload of an uplink information transfer message. The data communicating means may also be operable to receive said data as a data packet in a payload of an RRC connection setup complete message.

The information obtaining means may be operable to obtain said information from said communications device as part of a procedure for establishing said radio bearer.

The information may comprise an indication that no further data is to be sent or received by said communications device. The information may comprise an indication that further data is to be sent or received by said communications device. In this case, the further data may comprise data to be received, by said communications device, in response to data sent by said communications device. The further data may also comprise data requiring establishment of a user plane connection for said communications device.

The obtaining means may be operable to obtain said information from said communications device by receiving at least one RRC message at said base station. In this case, the obtaining means may be operable to receive said at least one RRC message as part of an RRC connection establishment procedure for said mobile communications device. For example, the obtaining means may be operable to obtain said information from at least one information element in said at least one RRC message.

The at least one RRC message may include at least one non-access stratum (NAS) message. In this case, the obtaining means may be operable to obtain said information from said at least one NAS message.

The data communicating means may be operable to receive said data as a data packet in a payload of said at least one RRC message in which said information is provided by said communications device. The data packet may require a response to be received at said communications device, in which case said obtained information may indicate that no further data is to be sent or received by said communications device after receipt of said response. The data packet may comprise data sent in response to data previously received by said communications device, in which case said obtained information may indicate that no further data is to be sent or received by said communications device after sending said response.

In one possibility, the base station may comprise said obtaining means. The obtaining means may be operable to provide said obtained information to a core network entity.

The maintaining means may be operable to i) maintain said radio bearer if said information indicates that further data is to be sent or received by said communications device and ii) release said radio bearer if said obtained information indicates that no further data is to be sent or received by said communications device.

The maintaining means may be operable to request said communications device to establish a user-plane connection if said obtained information indicates that a user-plane connection is required by said communications device.

The maintaining means may be operable to request said communications device to release said radio bearer if said obtained information indicates that no further data is to be sent or received by said communications device.

The apparatus may comprise at least one of a base station and a mobility management entity operating in accordance with long term evolution (LTE) standards.

In one aspect, the invention provides a communications device for providing information to a network entity for use in determining whether a radio bearer should be maintained or released, the communications device comprising a processor and a transceiver The processor is configured to establish the radio bearer via a base station of a communications system for sending or receiving data and the transceiver is configured to send or receive data using the established radio bearer. The processor is configured to determine at least one of: i) whether or not any further data is to be sent or received by said communications device and ii) whether or not a user-plane connection is required for said communications device; and to provide to the network entity information identifying a result of said determination for use, by the network entity, in determining whether the radio bearer should be maintained or released accordingly.

In one aspect, the invention provides an apparatus for managing a radio bearer for a communications device, the apparatus comprising a processor and a transceiver. The transceiver is configured to communicate data with said communications device using a radio bearer. The processor is configured to: obtain information from said communications device, said information indicating, for the communications device, at least one of: i) whether or not any further data is to be sent or received by said communications device and ii) whether or not a user-plane connection is required by said communications device; and determine, from said obtained information, whether the radio bearer should be maintained or released; and maintain said radio bearer in dependence of said determination.

The invention also provides corresponding methods and a system comprising the above communications device, the above base station, and the above mobility management entity.

A further aspect of the present invention provides a computer program product comprising computer implementable instructions for causing a programmable computer device to become configured as a communications device, the base station, or the mobility management entity as described above. The computer software products may be provided on a carrier signal or on a recording medium, such as a CD, DVD or the like.

Advantageous Effects of Invention

According to the present invention, it is possible to provide an improved management of a connection release in case of small data transmissions by a MTC device, and result in a more optimal usage of the overall resources of a communication system.

DESCRIPTION OF EMBODIMENTS

Overview

Figure 1:
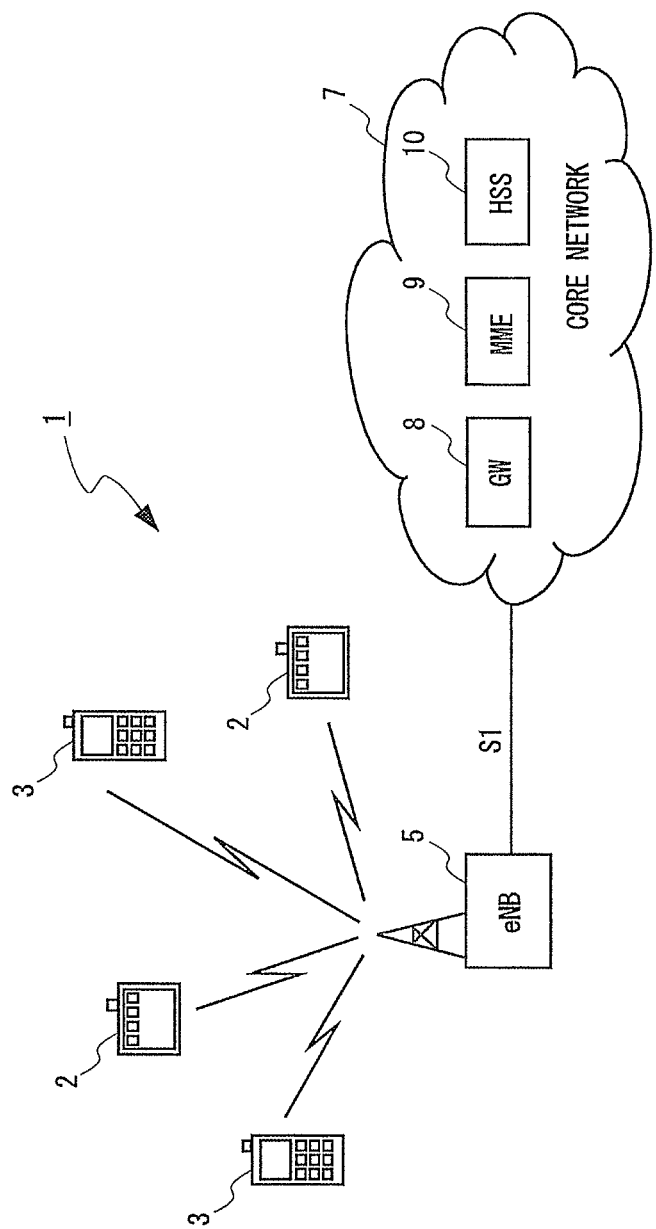
FIG. 1 illustrates schematically a cellular telecommunications system to which embodiments of the invention may be applied.

FIG. 1 schematically illustrates a telecommunications network 1 in which MTC devices 2, mobile telephones 3, and other communications devices (not shown) can communicate with each other or MTC service providers (e.g. an MTC server) via a base station 5 and a core network 7 using an E-UTRA radio access technology (RAT). As those skilled in the art will appreciate, whilst two MTC devices 2, two mobile telephones 3, and one base station 5 are shown in FIG. 1 for illustration purposes, the system, when implemented, will typically include other base stations and communications devices.

The base station 5 is connected to the core network 7 via an S1 interface and to other base stations via an X2 interface (not shown). The core network 7 includes a gateway 8 for connecting to other networks, such as the Internet and/or to servers hosted outside the core network 7. It will be appreciated that the functionalities of the gateway 8 may be split between two logical (and/or physical) entities. In this case, the gateway functionality for connecting the base station 5 (hence the MTC devices 2 and the mobile telephones 3) to the core network 7 is carried out by a so-called serving gateway (S-GW) entity whereas the gateway functionality for connecting to other (external) networks is carried out by a so-called a packet data network (PDN) gateway, or simply P-GW, entity.

A mobility management entity (MME) 9 is the network node responsible for keeping track of the locations of the mobile communication devices (e.g. mobile telephones 3 and the MTC devices 2) within the communications network 1. In particular, the MME 9 stores an identifier of the mobile communication devices' last known cell (or tracking area) so that they can be notified when there is an incoming (voice or data) call for them and that a communication path is set up via the base station 5 currently serving the particular mobile communication device.

A home subscriber server (HSS) 10 stores subscription related information and control parameters specific for each communications device (e.g. the MTC devices 2 and the mobile telephones 3). The HSS 10 also stores information identifying which ones of the communications devices are configured as machine-type communication devices (e.g. the MTC devices 2 and/or a mobile telephone 3 when it is running an MTC client) and provides this information to the other network entities when needed.

As explained above, the MTC devices 2 and mobile telephones 3 establish an RRC connection with the base station 5 in order to be able to communicate with other devices via that base station 5 (and the core network 7). The MTC devices 2 support the small data transmission functionality so that their communications with other devices can be carried out in an efficient manner and with minimal network impact.

In addition, the MTC devices 2 shown in FIG. 1 are also configured to provide assistance information to the MME 9 in order to indicate any further expected communications involving the MTC devices 2. The MME 9 may thus beneficially use the assistance information provided by each MTC device 2 in its determination whether or not to terminate the RRC connection (and possibly the S1 connection) for that particular MTC device 2.

Specifically, an MTC device 2 can provide at least one of the following types of assistance information:

i) Information indicating that no further data is expected to be sent/received by/at the MTC 2. In this case the MME 9 can beneficially instigate the release of the RRC and/or S1 connection immediately.

ii) Information indicating that the MTC device 2 expects to receive response data (i.e. an acknowledgment) from another device/server. In this case the MME 9 maintains the RRC and S1 connections for the MTC device 2 and waits for the response data. However, the MME 9 can beneficially instigate the release the RRC and/or S1 connection for the MTC device 2 after receipt of the response data, e.g. without the MTC device 2 having to send an indication described in point i) above. However, after receipt of the response data, the MME 9 may also wait for further assistance information and/or may take into account other information available to it before instigating the release of the RRC and/or S1 connection.

iii) Information indicating that user-plane establishment is expected/needed. If this indication is given by the MTC device 2, the MME 9 maintains the RRC/S1 connection for the MTC device 2. In this case, the MME 9 can beneficially trigger a full service request for the establishment of the user-plane for the given MTC device 2. In this case, the MME 9 may wait for further assistance information (such as in point i) or ii) above) before instigating the release of the RRC and/or S1 connection for the MTC device 2.

Beneficially, the provision of assistance information from the MTC device 2 to the MME 9 is achieved using NAS signalling. The NAS signalling carrying the assistance information can be embedded in any suitable RRC message exchanged between the MTC device 2 and the base station 5 so that it can be transmitted to the MME 9 regardless whether the MTC device 2 is involved in a mobile originated or mobile terminated small data transmission (and/or any other communication, such as regular data transmissions).

In particular, the MTC device 2 includes any assistance information in an information element in the form of a preference indication (e.g. a 'release preference indication' IE) which may be added to the NAS signalling message or the RRC message carrying the NAS signalling message (or both). If the release preference indication IE is included in the RRC message (i.e. the base station 5 can also read the release preference indication IE), then the base station 5 can decide whether or not to release the RRC/S1 connection for that MTC device 2 in accordance with the received preference indication.

In any case, when the MME 9 receives the assistance information, and decides to instigate the release of the RRC/S1 connection for the MTC device 2, it informs the base station 5 accordingly, which proceeds to release the applicable RRC/S1 connection.

The provision of the MTC device's 2 release preference (which takes into account any expected communication for/by that MTC device 2) can improve the decision making process at the MME 9 (or the base station 5). Since the release preference is based on information (expected communication) that may not be available to the network entity controlling the RRC/S1 connection, the provision of such assistance information by the MTC device 2 can result in a more optimal usage of the overall resources of the communication system 1. For example, the MTC devices 2 providing their release preference to the MME 9 and/or the base station 5 may not be required to send any keep-alive messages (or they may be required to send fewer keep-alive messages than other communication devices) in order to maintain an RRC connection with their serving base station 5.

MTC Device

Figure 2:
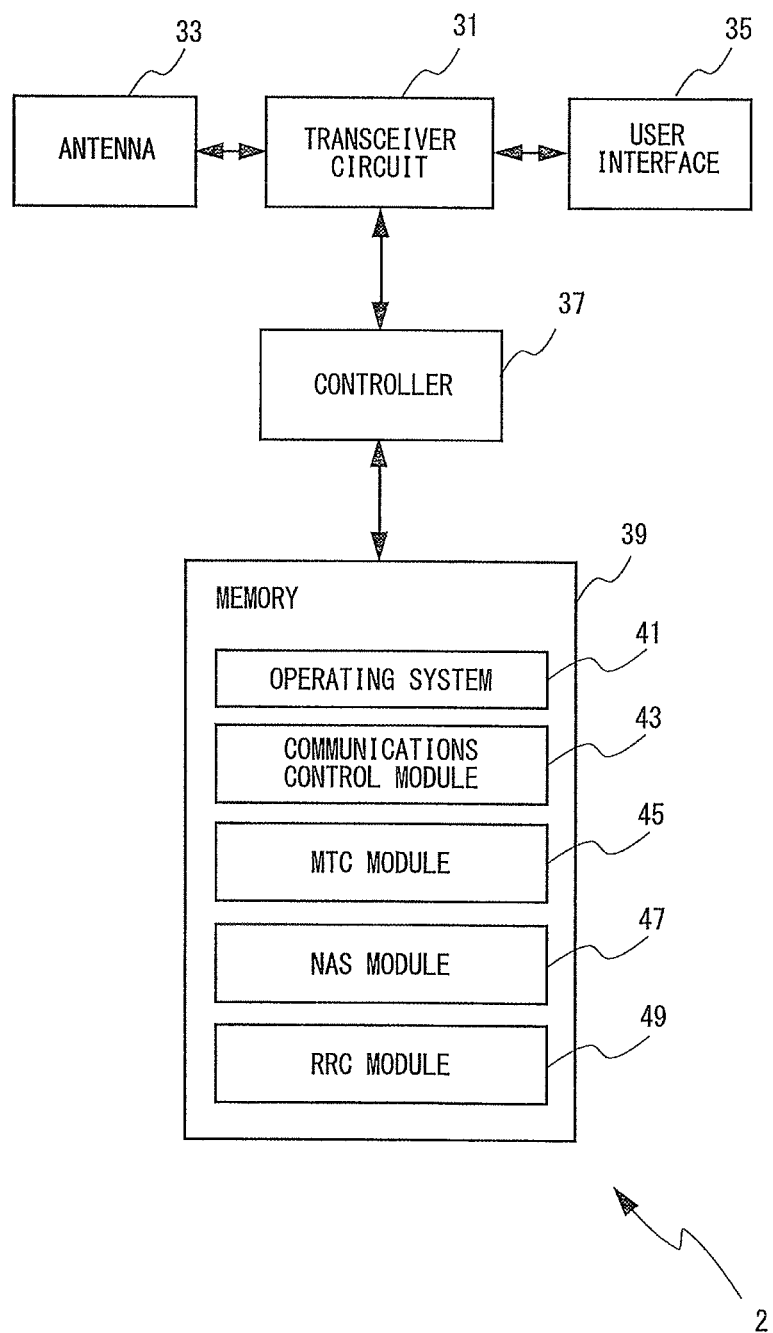
FIG. 2 is a block diagram of a machine-type device forming part of the system shown in FIG. 1.

FIG. 2 is a block diagram illustrating the main components of the MTC device 2 shown in FIG. 1. As shown, the MTC device 2 has a transceiver circuit 31 that is operable to transmit signals to and to receive signals from a base station 5 via one or more antenna 33. The MTC device 2 has a controller 37 to control the operation of the mobile telephone 3. The controller 37 is associated with a memory 39 and is coupled to the transceiver circuit 31. Although not necessarily required for its operation, the MTC device 2 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the MTC device 2 by, in this example, program instructions or software instructions stored within memory 39. As shown, these software instructions include, among other things, an operating system 41, a communications control module 43, an MTC module 45, a non-access stratum module 47, and a radio resource control module 49.

The communications control module 43 controls the communication between the MTC device 2 and other communications devices, such as other MTC devices 2, mobile telephones 3, or the base station 5.

The MTC module 45 generates a release preference indication for sending to the mobility management entity (or another network element). In particular, the MTC module 45 obtains information from the communications control module 43 regarding any expected communication by the MTC device 2 and generates the release preference indication in dependence of the obtained information.

The non-access stratum module 47 exchanges NAS signalling messages with the MME 9 (via the transceiver circuit 31). If a release preference is to be indicated in a NAS message, the non-access stratum module 47 also includes the preference indication (obtained from the MTC module 45) in the NAS message (e.g. in an information element) it sends to the MME 9.

The radio resource control module 49 exchanges RRC signalling messages with the base station 5 (via the transceiver circuit 31). If requested to do so by the non-access stratum module 47, the radio resource control module 49 includes any NAS message (including any NAS IE) generated by the non-access stratum module 47 in the RRC message it sends to the base station 5. If a release preference is to be indicated in an RRC message, the radio resource control module 49 also includes the preference indication in the RRC message (e.g. in an information element in the RRC message) it sends to the base station 5.

Base Station

Figure 3:
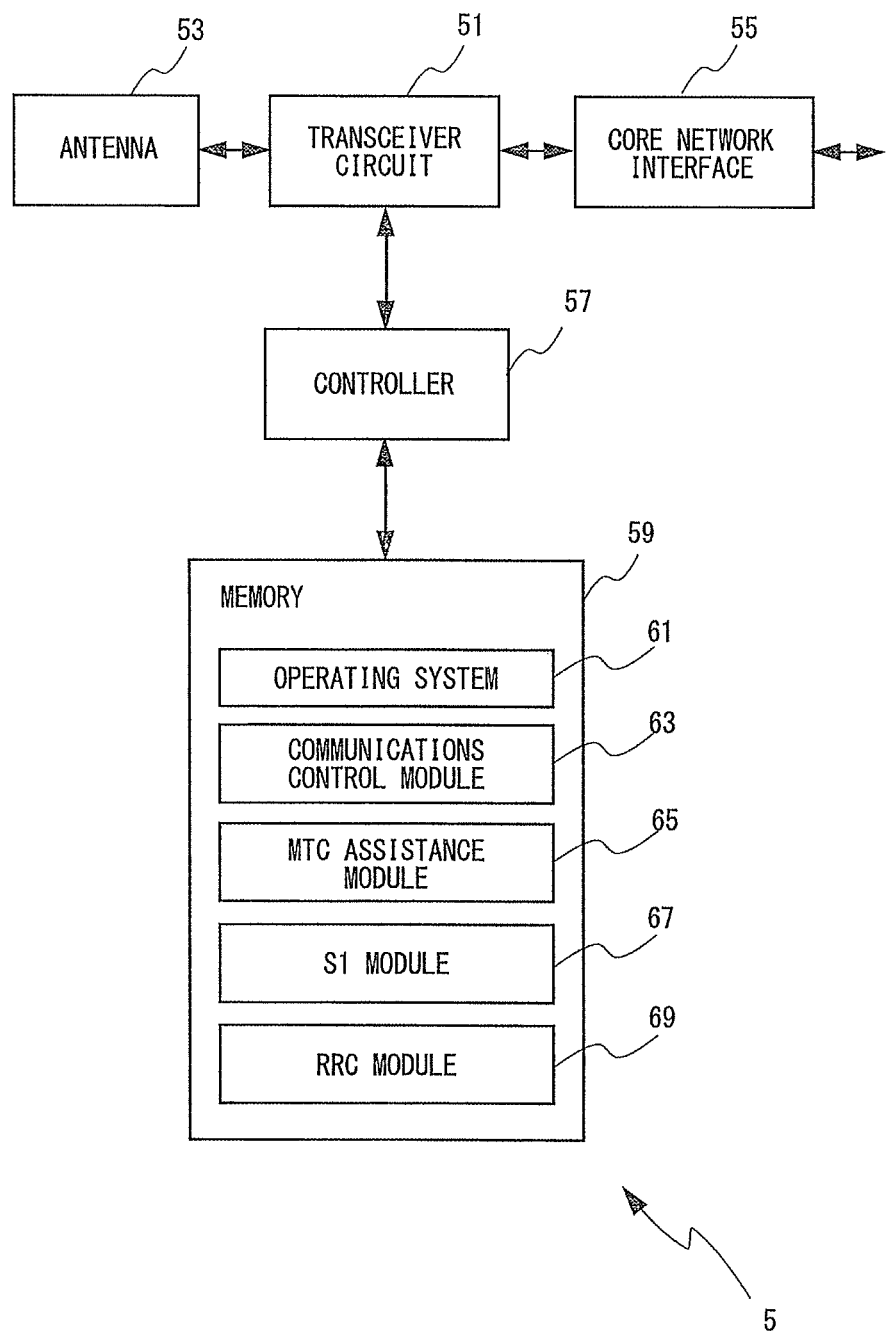
FIG. 3 is a block diagram of a base station forming part of the system shown in FIG. 1.

FIG. 3 is a block diagram illustrating the main components of the base station 5 shown in FIG. 1. As shown, the base station 5 has a transceiver circuit 51 for transmitting signals to and for receiving signals from the communications devices (such as MTC devices 2/mobile telephones 3) via one or more antenna 53, a core network interface 55 for transmitting signals to and for receiving signals from the core network 7. The base station 5 has a controller 57 to control the operation of the base station 5. The controller 57 is associated with a memory 59.

The controller 57 is configured to control the overall operation of the base station 5 by, in this example, program instructions or software instructions stored within memory 59. As shown, these software instructions include, among other things, an operating system 61, a communications control module 63, an MTC assistance module 65, an S1 module 67, and a radio resource control module 69.

The communications control module 63 controls the communication between the base station 5 and the MTC devices 2, the mobile telephones 3 and other network entities that are connected to the base station 5. The communications control module 63 also controls the separate flows of downlink user traffic and control data to be transmitted to the communications devices associated with this base station 5 including, for example, control data for managing operation of the MTC devices 2 and/or the mobile telephones 3.

The MTC assistance module 65 receives and handles assistance information from the MTC device 2 including the release preference indication. The indication may be received either via the RRC module 69 (if included in an RRC message from the MTC device 2) or the S1 module 67 (if sent via the MME 9, e.g. using NAS signalling).

The S1 module 67 exchanges S1 signalling messages with the MME 9 (via the transceiver circuit 51). If the MME 9 requests the S1 module 67 to do so, it proceeds to release the S1 connection for the MTC device 2 as requested by the MME 9.

The radio resource control module 69 exchanges RRC signalling messages with the MTC device 2 (via the transceiver circuit 51). If the RRC message includes any NAS message, the radio resource control module 69 forwards the NAS message (including any NAS IE) to the MME 9 (via the S1 module 67). If a release preference is indicated in an RRC message received from an MTC device 2, depending on its configuration, the radio resource control module 69 can either proceed to release the RRC connection for that MTC device 2 in accordance with the received release preference indication or forward the indication to the MME 9. If the MME 9 requests the radio resource control module 69 to do so, it proceeds to release the RRC connection for the MTC device 2 as requested by the MME 9.

Mobility Management Entity

Figure 4:
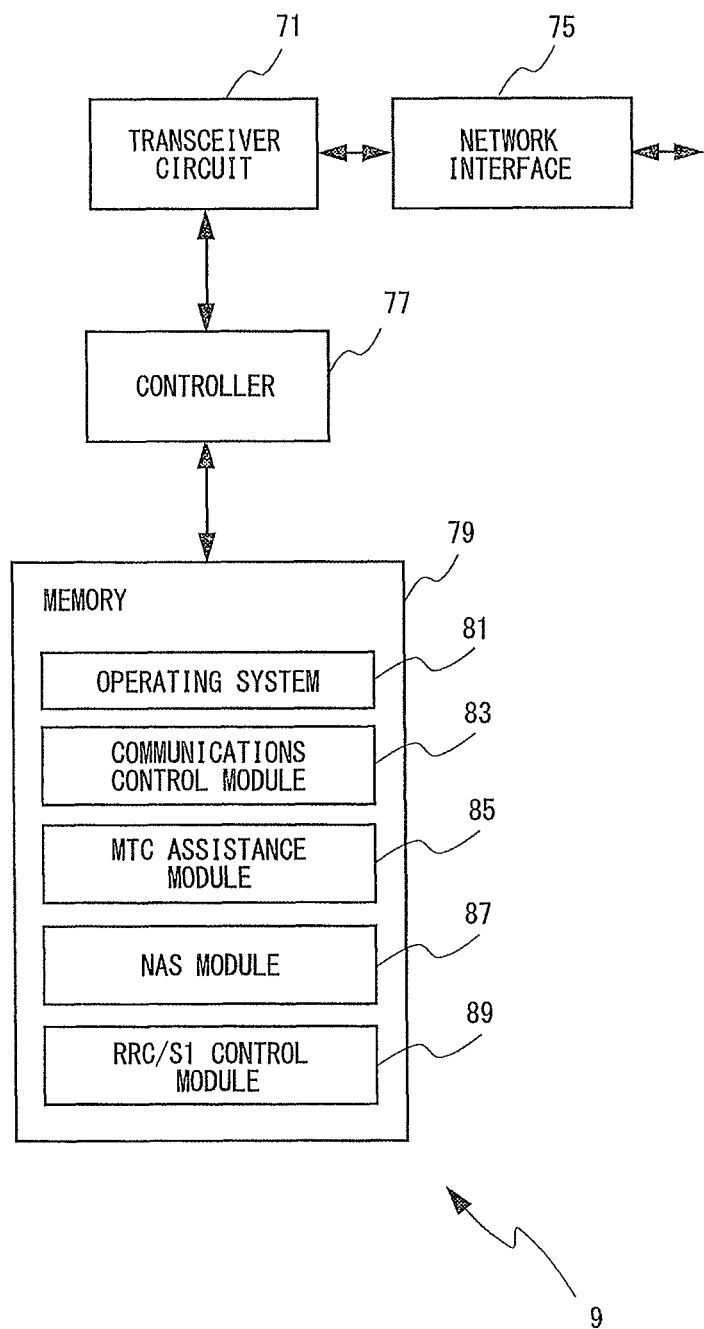
FIG. 4 is a block diagram of a mobility management entity forming part of the system shown in FIG. 1.

FIG. 4 is a block diagram illustrating the main components of the mobility management entity 9 shown in FIG. 1. As shown, the base station 5 has a transceiver circuit 71 for transmitting signals to and for receiving signals from the other communications devices (such as the MTC devices 2/mobile telephones 3/base stations 5/gateway 8) via a network interface 75. The mobility management entity 9 has a controller 77 to control the operation of the mobility management entity 9. The controller 77 is associated with a memory 79.

The controller 77 is configured to control the overall operation of the mobility management entity 9 by, in this example, program instructions or software instructions stored within memory 79. As shown, these software instructions include, among other things, an operating system 81, a communications control module 83, an MTC assistance module 85, a non-access stratum module 87, and an RRC/S1 control module 89.

The communications control module 83 controls the communication between the mobility management entity 9 and the MTC devices 2/mobile telephones 3 (i.e. via the base station 5) and other network entities that are connected to the mobility management entity 9.

The MTC assistance module 85 obtains assistance information relating to the MTC device 2, including any release preference indication. In dependence of any obtained preference indication (and/or any further information available to it), the MTC assistance module 85 decides whether or not to maintain the RRC/S1 connection for the MTC device 2. If the MTC assistance module 85 decides to release the RRC/S1 connection, it informs the base station 5 (via the RRC/S1 control module 89) accordingly.

The non-access stratum module 87 exchanges NAS signalling messages with the MTC device 2 (via the transceiver circuit 71). If a release preference is received via a NAS message, the non-access stratum module 87 provides the received preference indication to the MTC assistance module 85, also identifying which MTC device 2 sent the preference indication.

The RRC/S1 control module 89 manages the RRC and/or S1 connections for the MTC devices 2 (and other communications devices) managed by this MME 9. The RRC/S1 control module 89 also controls the release of the RRC/S1 connection in dependence of the decision made by the MTC assistance module 85.

In the above description, the MTC device 2, the base station 5, and the mobility management entity 9 are described for ease of understanding as having a number of discrete modules (such as the communications control modules and the MTC modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation

A more detailed description will now be given (with reference to FIG. 5 and FIG. 6) of the scenario discussed above where a UE comprising an MTC device 2 provides assistance information to the mobility management entity 9 for controlling the release of a connection for this MTC device 2.

Figure 5:
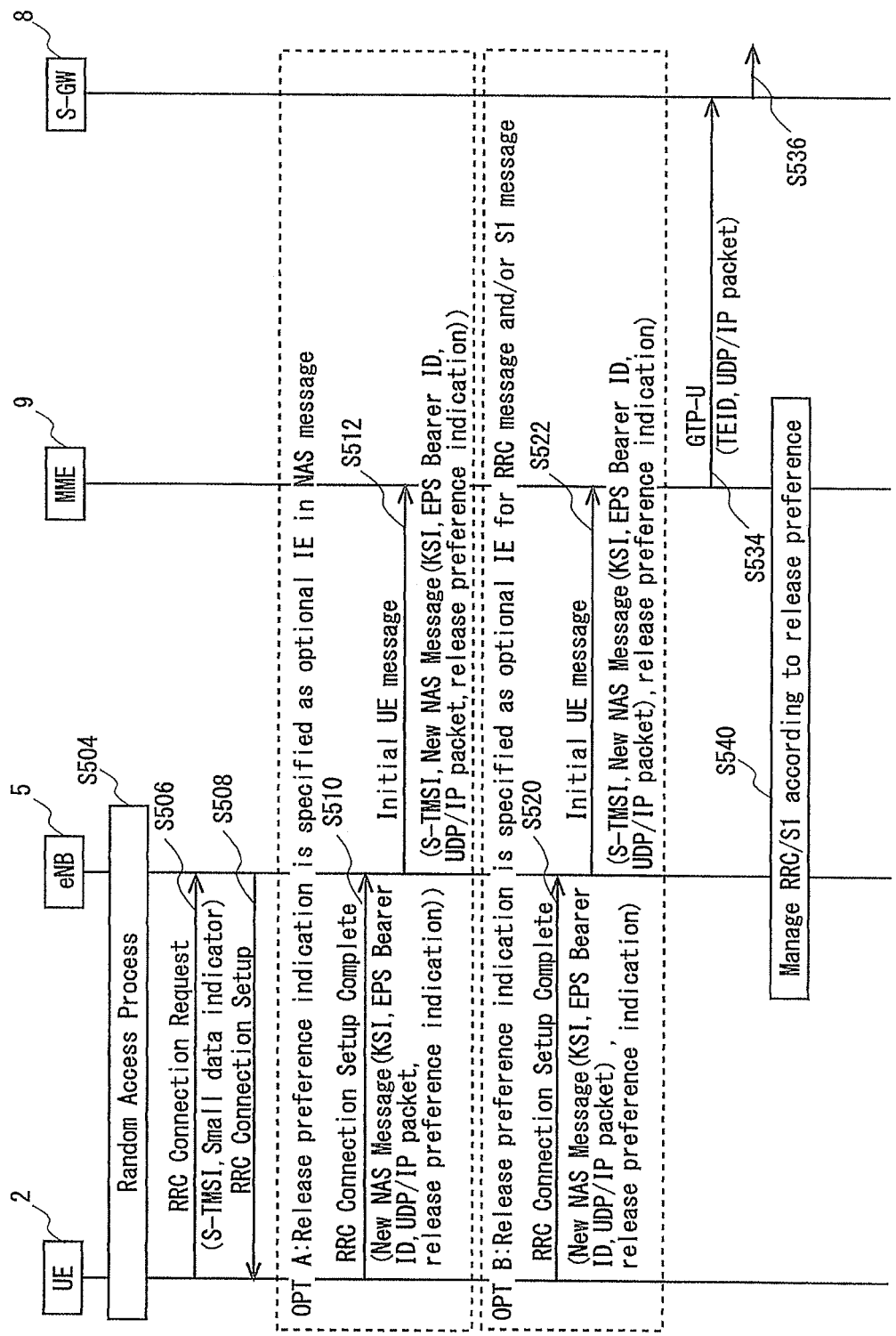
FIG. 5 is an example timing diagram illustrating the provision of assistance information during connection setup in a Mobile Originated small data transfer scenario.

FIG. 5 is an example timing diagram illustrating the provision of assistance information during connection setup by the MTC device 2 (denoted 'UE'). This procedure may be followed, for example, in case of a mobile originated (MO) small data transmission scenario.

In this example, as shown in step s504, the MTC device 2 initially performs a random access procedure with the base station 5 in order to be able to communicate with the base station 5.

Once the MTC device 2 is granted communication resources during the random access procedure, its RRC module 49 generates and sends, in step S506, a message requesting the base station 5 to establish an RRC connection for/with the MTC device 2. This 'RRC connection request' includes information identifying the MTC device 2 (e.g. its S-Temporary Mobile Subscriber Identity (S-TMSI)) and an indication that the MTC device 2 is configured to send/receive small data transmissions.

If the request by the MTC device 2 can be accommodated, the base station 5 (using its RRC module 69) generates and sends an 'RRC Connection Setup' message, as shown in step S508. After receiving this message, the MTC device 2 is ready to communicate with other devices via this base station 5. Since the RRC connection has been requested by the MTC device 2 for this purpose, this scenario can also be referred to as a mobile originated communication scenario.

However, at this point the MME 9, the base station 5, and/or any other network entity may not have information on the amount of data to be sent/received by this MTC device 2.

Therefore, the MTC device 2 provides information to assist the MME 9 and/or the base station 5 to manage the RRC connection that has been established in the preceding step. This assistance information can also be used by the MME 9 and/or the base station 5 to manage the S1 connection (between the base station 5 and the core network 7) for communications by this MTC device 2.

Depending on the amount of data to be sent/received by the MTC device 2, the assistance information may be provided in any one (or more) of the following ways:

i) If the MTC device 2 expects that no further data will be sent or received (i.e. other than the data already included in this message), then it can provide a release preference indication to indicate its preference for the MME 9 (or alternatively the base station 5) to release the RRC and/or S1 connection for the MTC device 2 immediately (or at any point in time).

ii) If the MTC device 2 expects to receive response data (e.g. an acknowledgment) from another communications device or an MTC server, then it can provide a release preference indication to indicate its preference for the MME 9 (or alternatively the base station 5) to keep the RRC/S1 connection alive and only release the connection(s) after the response data is received.

iii) If the MTC device 2 expects/requires the establishment of a user-plane connection (e.g. in order to send/receive data other than 'small data communications' data), then it can provide a release preference indication to indicate its preference for the MME 9 (or alternatively the base station 5) to trigger a full service request for user-plane establishment.

As shown in FIG. 5, in case of an MO scenario, the MTC device 2 has two main options to indicate its release preference.

In a first possibility denoted 'OPT A', the MTC device 2 (using its RRC module 49) generates and sends, at step S510, a message to the base station 5 indicating that the RRC connection has been set up (e.g. an 'RRC Connection Setup Complete' message). The RRC module 49 also includes in this RRC message a NAS message generated by the NAS module 47. This NAS message includes, amongst others, the MTC device's 2 release preference indication and the initial data packet ('UDP/IP packet') that the MTC device 2 needs to send to another communications device (or server).

As shown in step S512, the base station 5 forwards the contents of the message received at S510 to the MME 9. This is done by its S1 module 67 generating and sending a so-called 'Initial UE message' over the S1 interface. This S1 message identifies (by its S-TMSI) the MTC device 2 for which the RRC connection has been set up and also includes the NAS message carrying the MTC device's 2 release preference indication and its initial data packet.

If the MTC device 2 follows this possibility, it may use any suitable NAS information element to provide its release preference indication to the MME 9 or the base station 5 via the MME 9 (e.g. a 'release preference indication' IE included in the NAS message).

In a second possibility denoted 'OPT B', the MTC device 2 (using its RRC module 49) generates and sends, at step S520, an RRC message to the base station 5 indicating that the RRC connection has been set up (e.g. an 'RRC Connection Setup Complete' message). As in the previous possibility, the RRC module 49 includes in this RRC message a NAS message generated by the NAS module 47 (and this NAS message includes the MTC device's 2 initial data packet). However, rather than including its release preference indication in the NAS message, the MTC device 2 includes its release preference indication in the RRC message (generated by its RRC module 49). The MTC device 2 may use any suitable RRC information element to provide its release preference indication (e.g. a 'release preference indication' IE included in the RRC message).

As shown in step S522, the base station 5 forwards the contents of the message received at S520 to the MME 9. This is done by its S1 module 67 generating and sending a so-called 'Initial UE message' over the S1 interface. This S1 message identifies (by its S-TMSI) the MTC device 2 for which the RRC connection has been set up by the base station 5 and also includes the NAS message carrying the initial data packet by the MTC device 2. Since the MME 9 is not able to handle RRC information elements, the base station 5 includes the MTC device's 2 release preference indication in a suitable information element within the S1 message.

Regardless whether the first or second possibility is used, upon receipt of the Initial UE message (at S512/S522) the MME 9 proceeds to setting up the connection for the MTC device 2 in the core network 7 so that the MTC device 2 can send/receive data packets to other communications devices and/or servers.

Therefore, in step S534, the MME 9 generates and sends a user-plane GPRS Tunnelling Protocol (GTP-U) message to the gateway 8 serving the MTC device 2. This GTP-U message also includes user-plane data, i.e. the initial data packet ('UDP/IP packet') sent by the MTC device 2, which is then forwarded by the gateway 8 to its intended recipient (at S536).

As generally shown at step S540, after the initial data packet has been transmitted, the MME 9 or the base station 5 can start managing the RRC/S1 connection for the MTC device 2 in accordance with the received release preference indication.

If the received release preference comprises data transmissions of the type i) above, then the MME 9 or the base station 5 can initiate release of the RRC/S1 connection immediately after the initial data packet has been successfully forwarded to the recipient (or at least to the serving gateway 8), i.e. any time after step S534.

In case of a release preference indication of type ii), the MME 9 or the base station 5 can initiate the release of the RRC/S1 connection only after response data (e.g. an acknowledgement packet) for the initial data packet has been received by the MTC device 2. Of course, until receipt of the response data, the MTC device 2 may send further data packets and hence the RRC/S1 connection should be preferably maintained. However, in accordance with the release preference indication of type ii), the MTC device 2 is not expected to send any further data packets after receipt of the response data and hence the RRC/S1 connection can be released accordingly.

Finally, if the release preference indicated data transmissions of type iii), the MME 9 or the base station 5 does not initiate the release of the RRC/S1 connection until at least receiving further indication from the MTC device 2 and/or fulfillment of other release conditions (e.g. expiry of a user inactivity timer at the base station 5, receiving a request from another network entity to release the RRC/S1 connection, receiving an error indication, data held at the MME 9 indicates that the connection can be released, etc).

Figure 6:
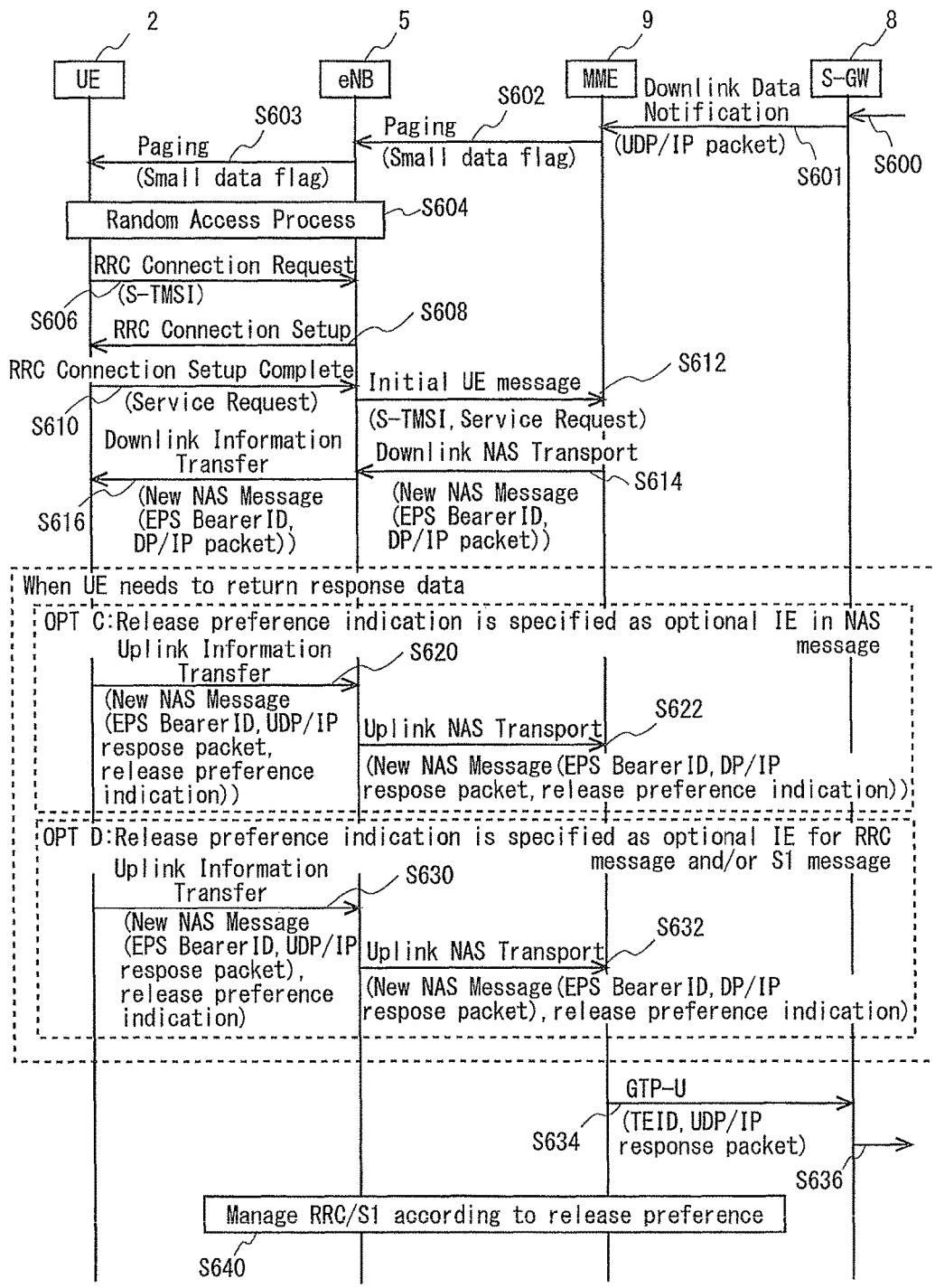
FIG. 6 is another example timing diagram illustrating the provision of assistance information during an information transfer procedure in a Mobile Terminated small data transfer scenario.

FIG. 6 is another example timing diagram illustrating the provision of assistance information during an information transfer procedure between the MTC device 2 and the mobility management entity 9. This procedure may be followed, for example, in case of a mobile terminated (MT) small data transmission scenario.

As shown at step S600, the serving gateway 8 receives data for the MC device 2 (e.g. from another communications device or a remote server). Therefore, in step S601, the gateway 8 generates and sends to the MME 9 a message notifying the MME 9 about the downlink data for the MTC device 2 ('Downlink Data Notification' message). The gateway 8 includes in this message the data (e.g. 'UDP/IP packet') to be delivered to the MTC device 2.

Upon receipt of the Downlink Data Notification message, the MME 9 initiates paging of the MTC device 2, as shown in step S602, which is performed by the base station 5 in step S603. If the data for the MTC device 2 is indicated to comprise data in accordance with the small data transmissions functionality, the paging message for the MTC device 2 also indicates this, e.g. by setting a flag (e.g. Small data flag) appropriately. At this point, the downlink data for the MTC device 2 is temporarily stored in the memory 79 of the MME 9 and awaits delivery to the MTC device 2 once an RRC connection has been set up.

In response to the paging message, the MTC device 2 performs a random access procedure with the base station 5, as shown in step S604, so that it can communicate (i.e. receive the incoming data) via the base station 5.

Once the MTC device 2 is granted communication resources, its RRC module 49 generates and sends, in step S606, a message requesting the base station 5 to establish an RRC connection for/with the MTC device 2. This 'RRC connection request' includes information identifying the MTC device 2 (e.g. its S-TMSI).

Next, the base station 5 (using its RRC module 69) generates and sends an 'RRC Connection Setup' message, as shown in step S608. After receiving this message, the MTC device 2 is ready to communicate with other devices via this base station 5. Since the RRC connection has been requested by the MTC device 2 in response to a paging message indicating downlink data, this scenario can also be referred to as a mobile terminated communication scenario.

The MTC device 2 confirms that the RRC connection has been successfully set up by using its RRC module 49 to generate and send, at step S610, a message to the base station 5 indicating that the RRC connection has been set up (e.g. an 'RRC Connection Setup Complete' message). The MTC device 2 also includes in this RRC message an indication of the service being requested, i.e. the delivery of download data indicated by the preceding paging message.

In response to this, as shown in step S612, the base station 5 (using its S1 module 67) generates and sends a message to the MME 9 (e.g. an 'Initial UE message'). This S1 message identifies (by its S-TMSI) the MTC device 2 for which the RRC connection has been set up and also includes the service request received from the MTC device 2.

Upon receipt of the message sent at step S612, the MME 9 processes the service request and, using its NAS module 87, it generates a new NAS message to the MTC device 2 and includes in this message, amongst others, the downlink data that is stored in its memory 79. As shown in step S614, the MME 9 generates and sends a downlink message (e.g. a 'Downlink NAS Transport' message) to the base station 5 over the S1 interface. This message includes the new NAS message carrying the downlink data for the MTC device 2 and instructs the base station 5 to forward the NAS message to the MTC device 2 over the RRC interface.

Accordingly, the base station 5 (using its RRC module 69) generates and sends an RRC message to transfer the downlink data (e.g. a 'Downlink Information Transfer' message) to the MTC device 2—as shown in step S616. This RRC message includes the NAS message generated by the MME 9 (which includes the data for the MTC device 2).

However, at this point the MME 9, the base station 5, and/or any other network entity may not have information on the amount of data to be received (and/or sent) by this MTC device 2 other than the initial data packet received at step S600.

Therefore, optionally, the MTC device 2 provides information to assist the MME 9 and/or the base station 5 to manage the RRC connection that has been established in the preceding step. This assistance information can also be used by the MME 9 and/or the base station 5 to manage the S1 connection (between the base station 5 and the core network 7) for communications by this MTC device 2, as described above. However, if the MTC device 2 does not have any data to send in response to the received downlink data and/or it does not expect to receive any further downlink data, the MTC device 2 may skip the following steps and hence conserve its battery power. In this case, the base station 5 and/or the MME 9 can still rely on conventional techniques to release the RRC/S1 connection for this MTC device 2.

However, if the MTC device 2 does send assistance information, in case of an MT scenario it has two main options to indicate its release preference, as shown in FIG. 6.

In a first possibility denoted 'OPT C', the MTC device 2 (using its RRC module 49) generates and sends, at step S620, a message to the base station 5 for sending uplink data (e.g. an 'Uplink Information Transfer' message). The RRC module 49 also includes in this message a new NAS message generated by the NAS module 47. This NAS message includes, amongst others, the MTC device's 2 release preference indication and any response data ('UDP/IP response packet') that the MTC device 2 needs to send.

As shown in step S622, the base station 5 forwards the contents of the message received at S620 to the MME 9. This is done by its S1 module 67 generating and sending a so-called 'Uplink NAS Transport' message over the S1 interface. This S1 message includes the new NAS message carrying the MTC device's 2 release preference indication and its response data packet.

If the MTC device 2 follows this possibility, it may use any suitable NAS information element to provide its release preference indication to the MME 9 or the base station 5 via the MME 9 (e.g. a 'release preference indication' IE included in the NAS message).

In a second possibility denoted 'OPT D', the MTC device 2 (using its RRC module 49) generates and sends, at step S630, a message to the base station 5 for sending uplink data (e.g. an 'Uplink Information Transfer' message). As in the previous possibility, the RRC module 49 includes in this RRC message the new NAS message generated by the NAS module 47 (and this NAS message includes the MTC device's 2 response data packet). However, rather than including its release preference indication in the NAS message, the MTC device 2 includes its release preference indication in the RRC message (generated by its RRC module 49). The MTC device 2 may use any suitable RRC information element to provide its release preference indication (e.g. a 'release preference indication' IE included in the RRC message).

As shown in step S632, the base station 5 forwards the contents of the message received at S630 to the MME 9. This is done by its S1 module 67 generating and sending a so-called 'Uplink NAS Transport' message over the S1 interface. This S1 message thus includes the NAS message carrying the response data packet by the MTC device 2. Since the MME 9 is not able to handle RRC information elements, the base station 5 includes the MTC device's 2 release preference indication in a suitable information element within the S1 message.

Steps S634 to S640 generally correspond to steps S534 to S540, respectively, hence their description is omitted for simplicity.

The above exemplary embodiments may result in improved management of the (RRC/S1) connection release in case of small data transmissions by the MTC device. This is achieved by considering information provided by the MTC device 2 (or an MTC application of a mobile telephone 3), which is normally not available at the network nodes. By taking into account the assistance information from the MTC device 2, the S1 and RRC connections can be advantageously:

released immediately by the network if it has been indicated that no further transmission from the MTC device 2 is expected;

kept active if it has been indicated that the MTC device 2 is expecting confirmation; and maintained and regular user-plane establishment be triggered if it is indicated that additional small data transmissions are expected by the MTC device 2.

Since the release preference is based on information (expected communication) that may not be available to the network entity controlling the RRC/S1 connection, the provision of such assistance information by the MTC device 2 can result in a more optimal usage of the overall resources of the communication system 1.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

It will be appreciated that whilst embodiments of the invention have been described with particular reference to the control of machine-type data connections (e.g. the release of a radio connection used for the transmission of a relatively small amount of data), the provision of assistance information (release preference indication) may benefit any other applications in which assistance information may be used to control the release of a connection for a communications device. For example, the above embodiments may be applicable for transmitting user data, backup data, synchronisation data, diagnostic data, monitoring data, usage statistics, error data and/or the like.

In the above description, an MME was given as an example NAS entity communicating with the MTC device (and/or the mobile telephone). However, it will be appreciated that the release preference indication may be provided to any other NAS-capable communications entity, e.g. a Serving GPRS Support Node (SGSN) within (or coupled to) the core network.

Although the above embodiments describe the MTC device providing assistance information to the MME (in the form of a release preference indication), it will be appreciated that any MTC-capable mobile telephone (i.e. a mobile telephone running an MTC client and/or supporting the small data transmission functionality) may also provide such assistance information.

The above embodiments describe specific examples for the MTC device to provide assistance information to the base station/MME serving the MTC device. However, it will be appreciated that the release preference indication may be provided using any suitable IE and/or any signalling message other than the NAS/RRC/S1 messages described above. It will also be appreciated that the release preference indication may be included in any part of the NAS/RRC/S1 message.

In the above description, the release preference indication given by the MTC device is described to relate to an existing communication (e.g. small data transmission) by the MTC device. However, it will be appreciated that this preference may relate to any future communications by the MTC device (i.e. until an updated preference indication is provided overriding any previous preference). It will also be appreciated that a separate preference may be indicated for MO and MT communications within the same or in different signalling messages. In particular, any one or more of the above described options A to D may be used in combination.

Further, it will be appreciated that the MTC device's release preference may comprise a default setting (either as a default factory configuration or as an application/subscriber specific setting). The default setting may be provided, for example, by the MTC device and/or the HSS and/or any other network entity either as part of the above described procedures or independently. If a default setting is used, it will be appreciated that the MTC device may only indicate its release preference only if a release preference other than the default one is to be applied for a particular communication by the MTC device. Thus, in the absence of an explicit release preference, the base station/MME may apply the default release preference for communications by the MTC device.

In the above embodiments, the base station is described to obtain the MTC device's preference indication from an information element included in the RRC part of the message sent from the MTC device to the MME. However, it will also be appreciated that the base station may obtain the MTC device's preference indication from the MME (i.e. indirectly) if this indication is included in the NAS part of the message sent by the MTC device (which the base station may not be able to access). This may be beneficial for network operators wishing to maintain control of the RRC/S1 release procedure at the base station rather than the MME irrespective of the type of information element used by the MTC device.

In the above description of FIG. 5 and FIG. 6, steps S540 and S640 are shown to take place only after the initial data packet has been transmitted from the MME to the gateway.

However, it will be appreciated that steps S540/S640 may also take place as soon as the release preference indication is received from the MTC device and/or may take place at different time for the base station and the MME, depending on when they obtain the MTC device's release preference indication (e.g. after step S510/S520 in case of the base station and after step S512/S522 in case of the MME).

In the above embodiments, a 3GPP radio communications (radio access) technology is used. However, any other radio communications technology (i.e. WLAN, Wi-Fi, WiMAX, Bluetooth, etc.) can be used by the MTC device in accordance with the above embodiments. The above embodiments are also applicable to 'non-mobile' or generally stationary user equipment.

Examples of MTC Applications

Some examples of machine type communication applications are listed in the following table (source: 3GPP TS 22.368, Annex B). This list is not exhaustive and is intended to be indicative of the scope of machine type communication applications.

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote | Sensors |
| Maintenance/Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

In the above description, the MTC device, the base station, and the mobility management entity are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the MTC device, to the mobile telephone, to the base station or to the mobility management entity as a signal over a computer network, or on a recording medium. Further, the functionality performed by part or all of this software may be performed using one or more dedicated hardware circuits. However, the use of software modules is preferred as it facilitates the updating of the MTC device (or the mobile telephone having an MTC application), the base station, the mobility management entity in order to update their functionalities.

Various other modifications will be apparent to those skilled in the art and will not be described in further detail here.

The above-mentioned processing may be executed by a computer. Also, it is possible to provide a computer program which causes a programmable computer device to execute the above-mentioned processing. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (Random Access Memory), etc.). The software modules may be provided to a computer using any type of transitory computer readable media. Examples of transitory computer readable media include electric signals, optical signals, and electromagnetic waves. Transitory computer readable media can provide the software modules to a computer via a wired communication line (e.g. electric wires, and optical fibers) or a wireless communication line.

The whole or part of the exemplary embodiments disclosed above can be described as, but not limited to, the following supplementary notes.

(Supplementary Note 1)

A communications device for providing information to a network entity for use in determining whether a radio bearer should be maintained or released, the communications device comprising:

means for establishing the radio bearer via a base station of a communications system for sending or receiving data;

means for sending or receiving data using the established radio bearer;

means for determining at least one of:

i) whether or not any further data is to be sent or received by said communications device; and ii) whether or not a user-plane connection is required for said communications device; and means for providing to the network entity information identifying a result of said determination for use, by the network entity, in determining whether the radio bearer should be maintained or released accordingly.

(Supplementary Note 2)

The communications device according to Supplementary note 1 wherein said means for sending or receiving data is operable to send or receive said data as a data packet in a payload of a control plane message.

(Supplementary Note 3)

The communications device according to Supplementary note 2 wherein said means for sending or receiving data is operable to send or receive said data as a data packet in a payload of a radio resource control, RRC, message.

(Supplementary Note 4)

The communications device according to Supplementary note 3 wherein said means for sending or receiving data is operable to send said data as a data packet in a payload of an uplink information transfer message or receive said data as a data packet in a payload of a downlink information transfer message.
(Supplementary Note 5)
The communications device according to Supplementary note 3 wherein said means for sending or receiving data is operable to send or receive said data as a data packet in a payload of an RRC connection setup complete message.
(Supplementary Note 6)
The communications device according to any of Supplementary notes 1 to 5 wherein said information providing means is operable to provide said information identifying a result of said determination to said network entity as part of a procedure for establishing said radio bearer.
(Supplementary Note 7)
The communications device according to any of Supplementary notes 1 to 6 wherein when said determining means is operable to determine that no further data is to be sent or received by said communications device, said information identifying a result of said determination comprises an indication that no further data is to be sent or received by said communications device.
(Supplementary Note 8)
The communications device according to any of Supplementary notes 1 to 6 wherein when said determining means is operable to determine that further data is to be sent or received by said communications device, said information identifying a result of said determination comprises an indication that further data is to be sent or received by said communications device.
(Supplementary Note 9)
The communications device according to Supplementary note 8 wherein said further data comprises data to be sent in response to data received by said communications device.
(Supplementary Note 10)
The communications device according to Supplementary note 8 or 9 wherein said further data comprises data requiring establishment of a user plane connection for said communications device.
(Supplementary Note 11)
The communications device according to any of Supplementary notes 1 to 10 wherein said providing means is operable to provide said information identifying a result of said determination to said network entity by sending at least one RRC message to said base station.
(Supplementary Note 12)
The communications device according to Supplementary note 11 wherein said providing means is operable to send said at least one RRC message as part of an RRC connection establishment procedure.
(Supplementary Note 13)
The communications device according to Supplementary note 12 wherein said providing means is operable to provide said information identifying a result of said determination using at least one information element in said at least one RRC message.
(Supplementary Note 14)
The communications device according to Supplementary note 12 or 13 wherein said at least one RRC message includes at least one non-access stratum, NAS, message.
(Supplementary Note 15)
The communications device according to Supplementary note 14 wherein said providing means is operable to provide said information identifying a result of said determination using said at least one NAS message.
(Supplementary Note 16)
The communications device according to any of Supplementary notes 11 to 15 wherein said means for sending or receiving data is operable to send said data as a data packet in a payload of said at least one RRC message in which said information identifying a result of said determination is provided to said network entity.
(Supplementary Note 17)
The communications device according to Supplementary note 16 wherein said data packet requires a response to be received at said communications device and wherein said information identifying a result of said determination indicates that no further data is to be sent or received by said communications device after receipt of said response.
(Supplementary Note 18)
The communications device according to Supplementary note 16 wherein said data packet comprises data sent in response to data received by said communications device and wherein said information identifying a result of said determination indicates that said communications device expects no further data to be sent or received after sending said data packet.
(Supplementary Note 19)
The communications device according to any of Supplementary notes 1 to 18 wherein said providing means is operable to send said information identifying a result of said determination to said base station.
(Supplementary Note 20)
The communications device according to any of Supplementary notes 1 to 19 wherein said providing means is operable to send said information identifying a result of said determination to a core network entity.
(Supplementary Note 21)
The communications device according to Supplementary note 20 wherein said providing means is operable to send said information identifying a result of said determination to said base station via said core network entity.
(Supplementary Note 22)
The communications device according to any of Supplementary notes 1 to 21 comprising at least one of a machine-type communications device, a mobile telephone, and user equipment operating in accordance with long term evolution, LTE, standards.
(Supplementary Note 23)
An apparatus for managing a radio bearer for a communications device, the apparatus comprising:
means for communicating data with said communications device using a radio bearer;
means for obtaining information from said communications device, said information indicating, for the communications device, at least one of:
i) whether or not any further data is to be sent or received by said communications device; and
ii) whether or not a user-plane connection is required by said communications device;
means for determining, from said obtained information, whether the radio bearer should be maintained or released; and
means for maintaining said radio bearer in dependence of said determination.
(Supplementary Note 24)
The apparatus according to Supplementary note 23 wherein said data communicating means is operable to send or receive said data as a data packet in a payload of a control plane message.

(Supplementary Note 25)
The apparatus according to Supplementary note 24 wherein said data communicating means is operable to send or receive said data as a data packet in a payload of a radio resource control, RRC, message.

(Supplementary Note 26)
The apparatus according to Supplementary note 25 wherein said data communicating means is operable to send said data as a data packet in a payload of a downlink information transfer message or receive said data as a data packet in a payload of an uplink information transfer message.

(Supplementary Note 27)
The apparatus according to Supplementary note 25 wherein said data communicating means is operable to receive said data as a data packet in a payload of an RRC connection setup complete message.

(Supplementary Note 28)
The apparatus according to any of Supplementary notes 23 to 27 wherein said information obtaining means is operable to obtain said information from said communications device as part of a procedure for establishing said radio bearer.

(Supplementary Note 29)
The apparatus according to any of Supplementary notes 23 to 28 wherein said information comprises an indication that no further data is to be sent or received by said communications device.

(Supplementary Note 30)
The apparatus according to any of Supplementary notes 23 to 29 wherein said information comprises an indication that further data is to be sent or received by said communications device.

(Supplementary Note 31)
The apparatus according to Supplementary note 30 wherein said further data comprises data to be received, by said communications device, in response to data sent by said communications device.

(Supplementary Note 32)
The apparatus according to Supplementary note 30 or 31 wherein said further data comprises data requiring establishment of a user plane connection for said communications device.

(Supplementary Note 33)
The apparatus according to any of Supplementary notes 23 to 32 wherein said obtaining means is operable to obtain said information from said communications device by receiving at least one RRC message at said base station.

(Supplementary Note 34)
The apparatus according to Supplementary note 33 wherein said obtaining means is operable to receive said at least one RRC message as part of an RRC connection establishment procedure for said communications device.

(Supplementary Note 35)
The apparatus according to Supplementary note 34 wherein said obtaining means is operable to obtain said information from at least one information element in said at least one RRC message.

(Supplementary Note 36)
The apparatus according to Supplementary note 34 or 35 wherein said at least one RRC message includes at least one non-access stratum, NAS, message.

(Supplementary Note 37)
The apparatus according to Supplementary note 36 wherein said obtaining means is operable to obtain said information from said at least one NAS message.

(Supplementary Note 38)
The apparatus according to Supplementary note 36 or 37 wherein said data communicating means is operable to receive said data as a data packet in a payload of said at least one RRC message in which said information is provided by said communications device.

(Supplementary Note 39)
The apparatus according to Supplementary note 38 wherein said data packet requires a response to be received at said communications device and wherein said obtained information indicates that no further data is to be sent or received by said communications device after receipt of said response.

(Supplementary Note 40)
The apparatus according to Supplementary note 38 wherein said data packet comprises data sent in response to data previously received by said communications device and wherein said obtained information indicates that no further data is to be sent or received by said communications device after sending said response.

(Supplementary Note 41)
The apparatus according to any of Supplementary notes 23 to 40 wherein said base station comprises said obtaining means.

(Supplementary Note 42)
The apparatus according to any of Supplementary notes 23 to 41 wherein said obtaining means is operable to provide said obtained information to a core network entity.

(Supplementary Note 43)
The apparatus according to any of Supplementary notes 23 to 42 wherein said maintaining means is operable to i) maintain said radio bearer if said information indicates that further data is to be sent or received by said communications device and ii) release said radio bearer if said obtained information indicates that no further data is to be sent or received by said communications device.

(Supplementary Note 44)
The apparatus according to Supplementary note 43 wherein said maintaining means is operable to request said communications device to establish a user-plane connection if said obtained information indicates that a user-plane connection is required by said communications device.

(Supplementary Note 45)
The apparatus according to Supplementary note 43 wherein said maintaining means is operable to request said communications device to release said radio bearer if said obtained information indicates that no further data is to be sent or received by said communications device.

(Supplementary Note 46)
The apparatus according to any of Supplementary notes 23 to 44 comprising at least one of a base station and a mobility management entity operating in accordance with long term evolution, LTE, standards.

(Supplementary Note 47)
A communications device for providing information to a network entity for use in determining whether a radio bearer should be maintained or released, the communications device comprising a processor and a transceiver, wherein:
the processor is configured to establish the radio bearer via a base station of a communications system for sending or receiving data;
the transceiver is configured to send or receive data using the established radio bearer;
the processor is configured to determine at least one of:
i) whether or not any further data is to be sent or received by said communications device; and
ii) whether or not a user-plane connection is required for said communications device; and the processor is configured to provide to the network entity information identifying a result of said determination for use, by the network entity, in determining whether the radio bearer should be maintained or released accordingly.
(Supplementary Note 48)

An apparatus for managing a radio bearer for a communications device, the apparatus comprising a processor and a transceiver, wherein:

the transceiver is configured to communicate data with said communications device using a radio bearer;

the processor is configured to: obtain information from said communications device, said information indicating, for the communications device, at least one of:

i) whether or not any further data is to be sent or received by said communications device; and ii) whether or not a user-plane connection is required by said communications device; and determine, from said obtained information, whether the radio bearer should be maintained or released; and maintain said radio bearer in dependence of said determination.
(Supplementary Note 49)

A system comprising the communications device according to any of Supplementary notes 1 to 22 and the apparatus according to any of Supplementary notes 23 to 46.
(Supplementary Note 50)

A method performed by a communications device for providing information to a network entity for use in determining whether a radio bearer should be maintained or released, the method comprising:

establishing the radio bearer via a base station of a communications system for sending or receiving data;

sending or receiving data using the established radio bearer;

determining at least one of:

iii) whether or not any further data is to be sent or received by said communications device; and iv) whether or not a user-plane connection is required for said communications device; and providing to the network entity information identifying a result of said determination for use, by the network entity, in determining whether the radio bearer should be maintained or released accordingly.
(Supplementary Note 51)

A method performed by a network apparatus for managing a radio bearer for a communications device, the method comprising:

communicating data with said communications device using a radio bearer;

obtaining information from said communications device, said information indicating, for the communications device, at least one of:

iii) whether or not any further data is to be sent or received by said communications device; and iv) whether or not a user-plane connection is required by said communications device; and determining, from said obtained information, whether the radio bearer should be maintained or released; and maintaining said radio bearer in dependence of said determination.
(Supplementary Note 52)

A computer implementable instructions product comprising computer implementable instructions for causing a programmable communications device to perform the method according to Supplementary note 50 or 51.

This application is based upon and claims the benefit of priority from United Kingdom Patent Application No. 1309074.1, filed on May 20, 2013, the disclosure of which is incorporated herein in its entirely by reference.

REFERENCE SIGNS LIST

1 TELECOMMUNICATIONS NETWORK
2 MTC DEVICE
3 MOBILE TELEPHONE
5 BASE STATION
7 CORE NETWORK
8 GATEWAY
9 MOBILITY MANAGEMENT ENTITY (MME)
10 HOME SUBSCRIBER SERVER (HSS)
31 TRANSCEIVER CIRCUIT
33 ANTENNA
35 USER INTERFACE
37 CONTROLLER
39 MEMORY
41 OPERATING SYSTEM
43 COMMUNICATIONS CONTROL MODULE
45 MTC MODULE
47 NON-ACCESS STRATUM MODULE
49 RADIO RESOURCE CONTROL MODULE
51 TRANSCEIVER CIRCUIT
53 ANTENNA
55 CORE NETWORK INTERFACE
57 CONTROLLER
59 MEMORY
61 OPERATING SYSTEM
63 COMMUNICATIONS CONTROL MODULE
65 MTC ASSISTANCE MODULE
67 S1 MODULE
69 RADIO RESOURCE CONTROL MODULE
71 TRANSCEIVER CIRCUIT
75 NETWORK INTERFACE
77 CONTROLLER
79 MEMORY
81 OPERATING SYSTEM
83 COMMUNICATIONS CONTROL MODULE
85 MTC ASSISTANCE MODULE
87 NON-ACCESS STRATUM MODULE
89 RRC/S1 CONTROL MODULE

The invention claimed is:

1. A user equipment (UE) in a wireless communication system, the UE comprising:
a processor configured to generate a parameter indicating whether downlink data transmission is expected following transmission of uplink data; and
a transmission circuit configured to transmit, to a base station, a RRC uplink message which includes the parameter and uplink data,
wherein the parameter is for a use of determining whether a connection is released,
wherein the parameter is forwarded from the base station to MME (Mobility Management Entity),
wherein when the parameter indicates downlink data transmission is expected by the UE, the connection is kept, and the connection is released after the base station transmits, to the UE, downlink data following the base station sending of the parameter.

2. The UE of the claim 1, wherein the connection is a S1 connection.

3. The UE of the claim 1, wherein the parameter is transmitted using an initial UE message.

4. A base station in a wireless communication system, the base station comprising:

a receiving circuit configured to receive, from a user equipment (UE), a RRC uplink message which includes a parameter and uplink data, the parameter generated by the UE, indicating whether downlink data transmission is expected following transmission of uplink data; and a transmission circuit configured to forward the parameter to a MME (Mobility Management Entity), wherein the parameter is for a use of determining whether a connection is released, wherein when the parameter indicates downlink data transmission is expected, the connection is kept, and the connection is released after the base station transmits, to the UE, downlink data following the base station sending of the parameter.

5. The base station of the claim 4, wherein the connection is a S1 connection.

6. The base station of the claim 4, wherein the parameter is received using an initial UE message.

7. A method in a user equipment (UE) in a wireless communication system, the method comprising:

generating a parameter indicating whether downlink data transmission is expected following transmission of uplink data; and transmitting, to a base station, a RRC uplink message which includes the parameter and uplink data, wherein the parameter is for a use of determining whether a connection is released, wherein the parameter is forwarded from the base station to MME (Mobility Management Entity), and wherein when the parameter indicates downlink data transmission is expected, the connection is kept, and the connection is released after the base station transmits, to the UE, downlink data following the base station sending of the parameter.

8. The method of the claim 7, wherein the connection is a S1 connection.

9. The method of the claim 7, wherein the parameter is transmitted using an initial UE message.

10. A method in a base station in a wireless communication system, the method comprising:

receiving, from a user equipment (UE), a RRC uplink message which includes a parameter and uplink data, the parameter generated by the UE, indicating whether downlink data transmission is expected following transmission of uplink data; and forwarding the parameter MME (Mobility Management Entity), wherein the parameter is for a use of determining whether a connection is released, wherein when the parameter indicates downlink data transmission is expected, the connection is kept, and the connection is released after the base station transmits, to the UE, downlink data following the base station sending of the parameter.

11. The method of the claim 10, wherein the connection is a S1 connection.

12. The method of the claim 10, wherein the parameter is received using an initial UE message.

* * * * *